US012060283B2

(12) United States Patent
Wu et al.

(10) Patent No.: US 12,060,283 B2
(45) Date of Patent: Aug. 13, 2024

(54) MAGNETIC MAGNESIUM-MANGANESE LAYERED DOUBLE METAL OXIDE COMPOSITE AND PREPARATION AND APPLICATION

(71) Applicant: SOUTH CHINA UNIVERSITY OF TECHNOLOGY, Guangdong (CN)

(72) Inventors: Pingxiao Wu, Guangdong (CN); Meiqing Chen, Guangdong (CN); Zhi Dang, Guangdong (CN); Nengwu Zhu, Guangdong (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 637 days.

(21) Appl. No.: 17/292,009

(22) PCT Filed: Oct. 25, 2019

(86) PCT No.: PCT/CN2019/113145

§ 371 (c)(1),
(2) Date: May 7, 2021

(87) PCT Pub. No.: WO2020/093880

PCT Pub. Date: May 14, 2020

(65) Prior Publication Data

US 2022/0002167 A1 Jan. 6, 2022

(30) Foreign Application Priority Data

Nov. 8, 2018 (CN) ........................ 201811325470.X

(51) Int. Cl.

| | |
|---|---|
| ***C01G 45/12*** | (2006.01) |
| ***B01J 20/02*** | (2006.01) |
| ***B01J 20/28*** | (2006.01) |
| ***B82Y 25/00*** | (2011.01) |
| ***B82Y 30/00*** | (2011.01) |
| ***B82Y 40/00*** | (2011.01) |
| ***C02F 1/48*** | (2023.01) |
| ***C02F 1/62*** | (2023.01) |
| ***C02F 101/20*** | (2006.01) |
| ***H01F 1/00*** | (2006.01) |

(52) U.S. Cl.

CPC ...... *C01G 45/1221* (2013.01); *B01J 20/0222* (2013.01); *B01J 20/28009* (2013.01); *C02F 1/481* (2013.01); *C02F 1/62* (2013.01); *H01F 1/0063* (2013.01); *B82Y 25/00* (2013.01); *B82Y 30/00* (2013.01); *B82Y 40/00* (2013.01); *C01P 2004/64* (2013.01); *C01P 2006/42* (2013.01); *C02F 2101/20* (2013.01)

(58) Field of Classification Search

CPC ................. H01L 1/0063; C01G 45/221; B01J 20/02222; B01J 20/28009; C02F 1/481; C02F 1/62

See application file for complete search history.

(56) References Cited

FOREIGN PATENT DOCUMENTS

| | | |
|---|---|---|
| CN | 101422719 | 5/2009 |
| CN | 101927165 | 12/2010 |
| CN | 102553660 | 7/2012 |
| CN | 104261547 | 1/2015 |
| CN | 105854796 | 8/2016 |
| CN | 108514880 | 9/2018 |
| CN | 108704610 | 10/2018 |
| CN | 109513419 | 3/2019 |
| JP | S5251756 | 4/1977 |

OTHER PUBLICATIONS

Tezuka et al, "The sysnthesis and Phosphate Adsorptive Properties of Mg(II)-Mn(III) Layered Double Hydroxides and THeir Heat_ Treated Materials", Bull. Chem. Soc. Jpn., 77, 2101-2107, (2004).*

Chitrakar et al, "Adsption of phosphate from seawater on calcined MgMn-layerd double hydroxides" Journal of Colloid and Interface Science, 290, (2005), 45-51, May 31, 2005.*

Chen et al, "Environmental application of MgMn-layered double oxide for simultaneous efficient removal of tetracycline and Cd pollution: Performace and mechanism", Journal of Environmental Management, 246 (2019), 164-173, Jun. 6, 2019.*

"International Search Report (Form PCT/ISA/210) of PCT/CN2019/113145", mailed on Jan. 23, 2020, with English translation thereof, pp. 1-6.

* cited by examiner

*Primary Examiner* — C Melissa Koslow
(74) *Attorney, Agent, or Firm* — JCIPRNET

(57) ABSTRACT

A magnetic magnesium-manganese layered double metal oxide composite and preparation and application. A soluble magnesium salt and a soluble manganese salt are dissolved in water to obtain a magnesium-manganese salt complex liquid; and a soluble carbonate and a soluble hydroxide are dissolved in water to obtain a carbonate-hydroxide complex liquid; a ferroferric oxide powder is added to the carbonate-hydroxide complex liquid, and then ethanol is added for ultrasonic dispersion to obtain a dispersion liquid; then the magnesium-manganese salt complex liquid is added for aging, centrifuging, washing, drying, grinding for sieving, and calcinating at 250-550° C. to obtain a magnetic magnesium-manganese layered double metal oxide composite. The composite of the present invention has relatively strong magnetism to Cd removal, and is featured by high adsorption efficiency, rapid adsorption rate and stability. Moreover, the composite can not only immobilize Cd efficiently, but also can be separated and recycled by magnet.

16 Claims, 3 Drawing Sheets

MAGNETIC MAGNESIUM-MANGANESE LAYERED DOUBLE METAL OXIDE COMPOSITE AND PREPARATION AND APPLICATION

CROSS-REFERENCE TO RELATED APPLICATION

This application is a 371 of international application of PCT application serial no. PCT/CN2019/113145, filed on Oct. 25, 2019, which claims the priority benefit of China application no. 201811325470.X, filed on Nov. 8, 2018. The entirety of each of the above mentioned patent applications is hereby incorporated by reference herein and made a part of this specification.

BACKGROUND

Technical Field

The present invention belongs to the technical field of an adsorbing material, and particularly relates to a magnetic magnesium-manganese layered double metal oxide composite and preparation and application.

A large number of cadmium can be accumulated in animals, plants and human bodies; and the cadmium in human body is mainly accumulated through food, water, and air. After entering the body, cadmium will form cadmium-proteins with proteins containing hydroxyl, thio and amino groups contained in human body, and get to the whole body through blood, and selectively be accumulated in kidney and liver. Kidney is a target organ of cadmium poisoning; and almost one third cadmium will be accumulated in kidney to seriously threaten the human body. Currently, the adsorption method is widely used to remove heavy metals in waste water; and the method is simple in operation, economical and effective, and the like. Particularly, metal oxides have high removal efficiency of which usually the major existence form is an ultrafine powder; if the ultrafine powder is directly applied to the conventional column adsorption system, there are technical bottlenecks, such as high pressure drop, difficult separation. How to develop an easily-separable material capable of immobilizing Cd efficiently has been one of research emphases.

SUMMARY

Technical Problem

Metal oxides currently used for removing heavy metals in waste water have a major existence form of ultrafine powder, and problems such as high pressure drop or difficult separation will occur if the metal oxides are directly used in the conventional column adsorption system. The material of the present invention is a magnetic magnesium-manganese layered double metal oxide composite, prepared based on high immobilization property of a magnesium-manganese layered double metal oxide to cadmium and strong magnetism of ferroferric oxide. Such composite possesses a relatively strong magnetism for removing Cd, with characteristics of high adsorption efficiency, high adsorption rate and stability. The composite can not only immobilize Cd efficiently, but also can be separated and recycled by magnet.

Solutions

Aiming at the disadvantages and shortcomings in the prior art, the principal objective of the prevent invention is to provide a method for preparing a magnetic magnesium-manganese layered double metal oxide composite.

Another objective of the present invention is to provide a magnetic magnesium-manganese layered double metal oxide composite prepared by the above method. The magnetic magnesium-manganese layered double metal oxide composite has relatively strong magnetism, adsorption ability and stability.

A further objective of the present invention is to provide application of the above magnetic magnesium-manganese layered double metal oxide composite in pollution treatment of heavy metal cadmium.

The objectives of the present invention are achieved by the following technical solution.

A method for preparing a magnetic magnesium-manganese layered double metal oxide composite, including the following steps.

(1) dissolving a soluble magnesium salt and a manganese salt in water to obtain a magnesium-manganese salt complex liquid; and dissolving a soluble carbonate and a soluble hydroxide in water to obtain a carbonate-hydroxide complex liquid, wherein the manganese salt is a divalent manganese salt.

(2) adding a ferroferric oxide powder to the carbonate-hydroxide complex liquid to obtain a first solution, and adding ethanol to the first solution to obtain a second solution, and dispersing the ferroferric oxide powder in the second solution by using ultrasonic dispersion to obtain a dispersion liquid, wherein the ferroferric oxide powder is a nanosized powder.

(3) adding the magnesium-manganese salt complex liquid to the dispersion liquid in step (2) to obtain a third solution, and aging and centrifuging the third solution to obtain a mixture, and washing, drying, grinding and sieving the mixture to obtain a precursor powder.

(4) calcinating the precursor powder obtained in step (3) at 250-550° C. to obtain a magnetic magnesium-manganese layered double metal oxide composite.

Preferably, the magnesium salt in step (1) is magnesium chloride, magnesium nitrate or magnesium sulfate; more preferably, magnesium chloride; the manganese salt is manganese chloride, manganese nitrate or manganese sulfate; more preferably, manganese chloride; the carbonate is sodium carbonate or potassium carbonate; more preferably, sodium carbonate; and the hydroxide is sodium hydroxide or potassium hydroxide; more preferably, sodium hydroxide.

Preferably, a molar ratio of the magnesium salt to the manganese salt to the carbonate to the hydroxide in step (1) is (5-60):(5-40):(2-30):(5-60), more preferably, (10-30):(10-20):(4-15):(10-30).

Preferably, in the magnesium-manganese salt complex liquid of step (1), the magnesium salt has a concentration of 0.03-0.09 mol/L; the manganese salt has a concentration of 0.01-0.045 mol/L; and in the carbonate-hydroxide complex liquid, the carbonate has a concentration of 0.005-0.2 mol/L; and the hydroxide has a concentration of 0.005-0.4 mol/L.

Preferably, a ratio of the mass of the ferroferric oxide to the mole of the carbonate in step (2) is (0.5-5) g:(0.01-1) mol.

Preferably, an adding amount of the ethanol in step (2) is 0.1-2 times a volume of the carbonate-hydroxide complex liquid; and the ultrasonic dispersion time is 10-60 min.

Preferably, the magnesium-manganese salt complex liquid in step (3) is added to the dispersion liquid in a way of dropwise adding with a rate of 0.1-5 mL/min.

Preferably, the aging time in step (3) is 12-36 h; the drying refers to drying for 12-36 h at 50-80° C.; and the grinding for sieving refers to grinding for 100 to 500-mesh sieving.

Preferably, the calcinating time in step (4) is 1-5 h.

A magnetic magnesium-manganese layered double metal oxide composite is prepared by the above method.

Provided is application of the magnetic magnesium-manganese layered double metal oxide composite in pollution treatment of heavy metal cadmium.

Beneficial Effects

The preparation method and the product obtained in the present invention have the following advantages and beneficial effects.

(1) The material of the present invention is a magnetic magnesium-manganese layered double metal oxide composite prepared based on the high immobilization property of a layered magnesium-manganese double metal oxide to cadmium and the strong magnetism of ferroferric oxide; the composite has relatively strong magnetism to Cd removal, and is featured by high adsorption efficiency, rapid adsorption rate and stability.

(2) The composite of the present invention can not only immobilize Cd efficiently, but also can be separated and recycled by magnet.

(3) Elements contained in the magnesium/manganese salt and ferroferric oxide are constituents of the nature, and are featured by low cost, wide source, free environmental pollution, and the like.

(4) The preparation method of the present invention is simple, and has mild reaction conditions, low energy consumption, high yield, and wide application prospect.

DESCRIPTION OF THE EMBODIMENTS

The present invention will be further described in detail in combination with the examples and drawings, and embodiments of the present invention are not limited thereto.

Example 1

A method for preparing a magnetic magnesium-manganese layered double metal oxide composite for the treatment of cadmium pollution in environment, and the specific steps are as follows.

(1) 0.026 mol magnesium chloride and 0.013 mol manganese chloride were accurately weighed, and dissolved by 500 mL deionized water to obtain a magnesium-manganese salt complex liquid; 0.01 mol sodium carbonate and 0.02 mol sodium hydroxide were dissolved by 250 mL deionized water to obtain a carbonate-hydroxide complex liquid;

(2) 0.25 g nanosized ferroferric oxide powder was added to the carbonate-hydroxide complex liquid, and 250 mL absolute ethanol was added for ultrasonic dispersion for 30 min to obtain a dispersion liquid;

(3) the magnesium-manganese salt complex liquid was slowly dropped into the dispersion liquid in step (2) with a rate of 1 mL/min, aged for 24 h, and then centrifuged at 4000 r/min for 5 min to remove a supernate; the obtained product was washed for several times with deionized water, and dried for 24 h at 60° C., ground for 200-mesh sieving to obtain a precursor powder.

(4) the precursor powder obtained in step (3) was placed in a muffle furnace and calcinated for 3 h at 350° C. to obtain a magnetic magnesium-manganese layered double metal oxide composite.

Figure 1:
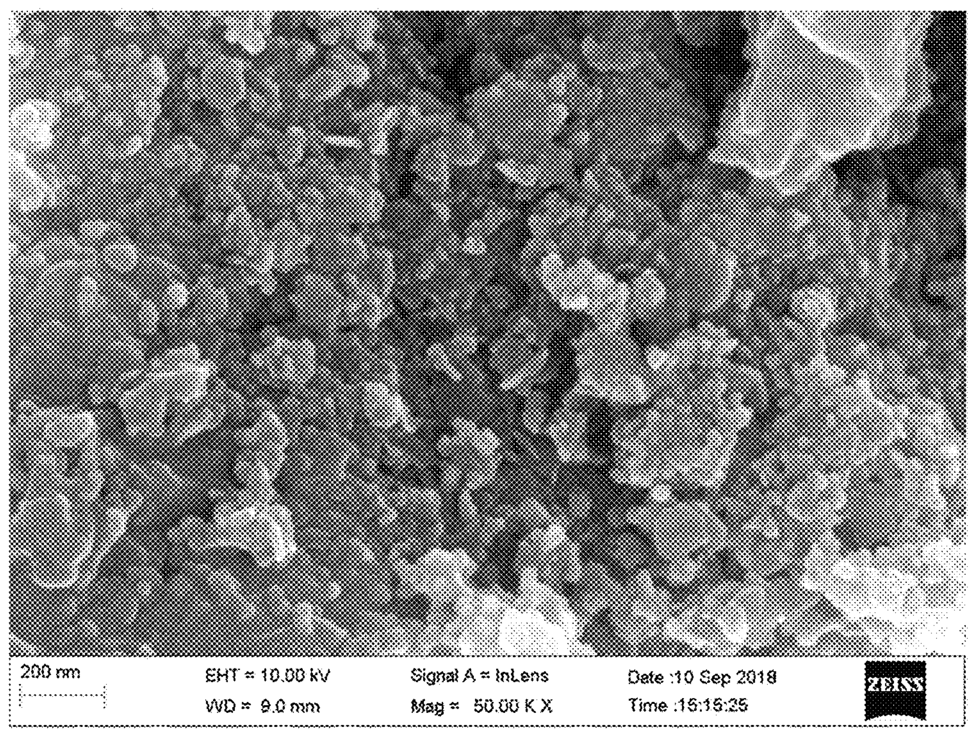
FIG. 1 shows an SEM diagram of a magnetic magnesium-manganese layered double metal oxide composite prepared in example 1.
Figure 2:
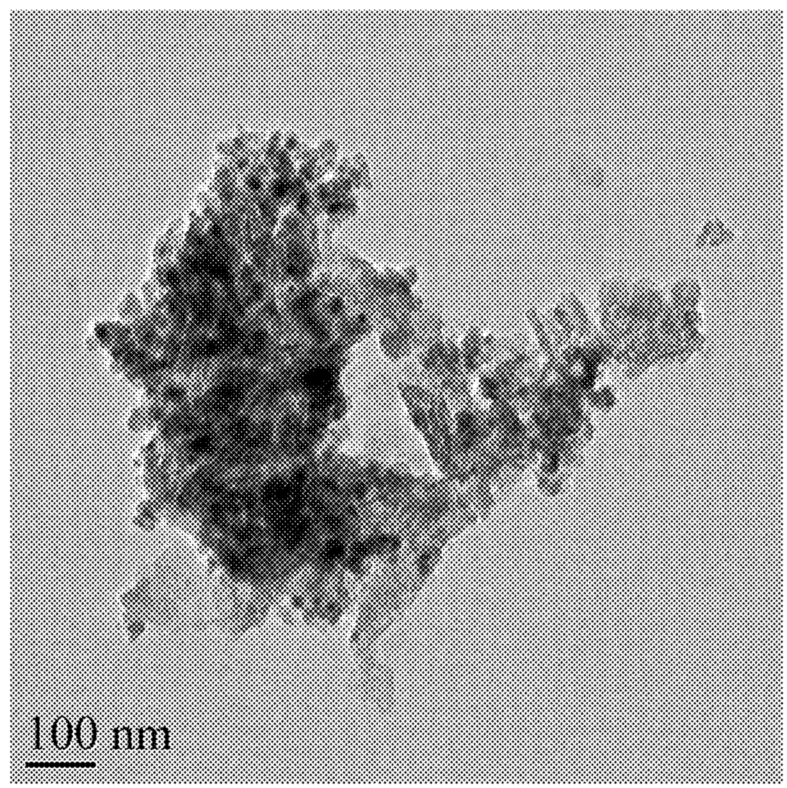
FIG. 2 shows a TEM diagram of the magnetic magnesium-manganese layered double metal oxide composite prepared in example 1.
Figure 3:
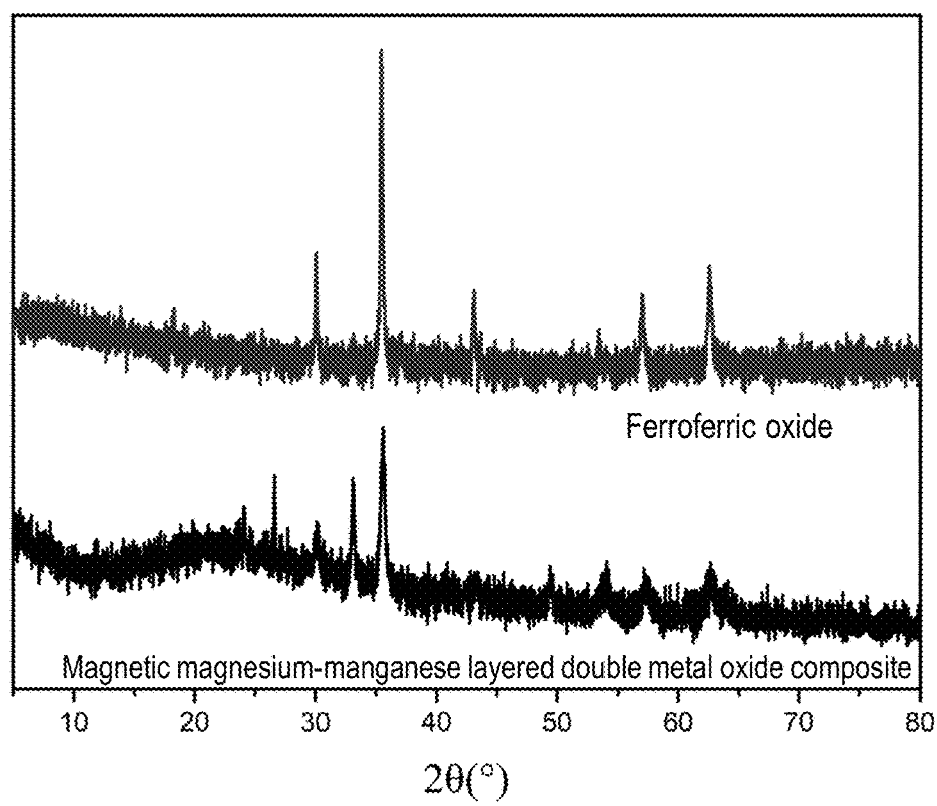
FIG. 3 shows an XRD diagram of the magnetic magnesium-manganese layered double metal oxide composite prepared in example 1.

The morphology and structure representation of the prepared magnetic magnesium-manganese layered double metal oxide composite are shown in FIGS. 1, 2 and 3. FIG. 1 shows an SEM diagram, FIG. 2 shows a TEM diagram and FIG. 3 shows an XRD diagram. It can be seen from FIG. 1 that in the magnetic magnesium-manganese layered double metal oxide composite, ferroferric oxide is evenly distributed on a sheet layer of a magnesium-manganese double metal oxide; from TEM of the composite in FIG. 2, it can be seen clearly that small particles are more evenly distributed on slices, which is consistent with the results of SEM. Therefore, it can be concluded that ferroferric oxide is evenly distributed on the magnesium-manganese double metal oxide. It can be seen from FIG. 3 that the magnetic magnesium-manganese layered double metal oxide composite has a characteristic peak of ferroferric oxide on the XRD spectrum, indicating that ferroferric oxide interacts with the magnesium-manganese double metal oxide, and a magnetic magnesium-manganese layered double metal oxide composite was formed.

Test on the application effects of the obtained magnetic magnesium-manganese layered double metal oxide composite in pollution treatment of heavy metal cadmium.

Figure 4:
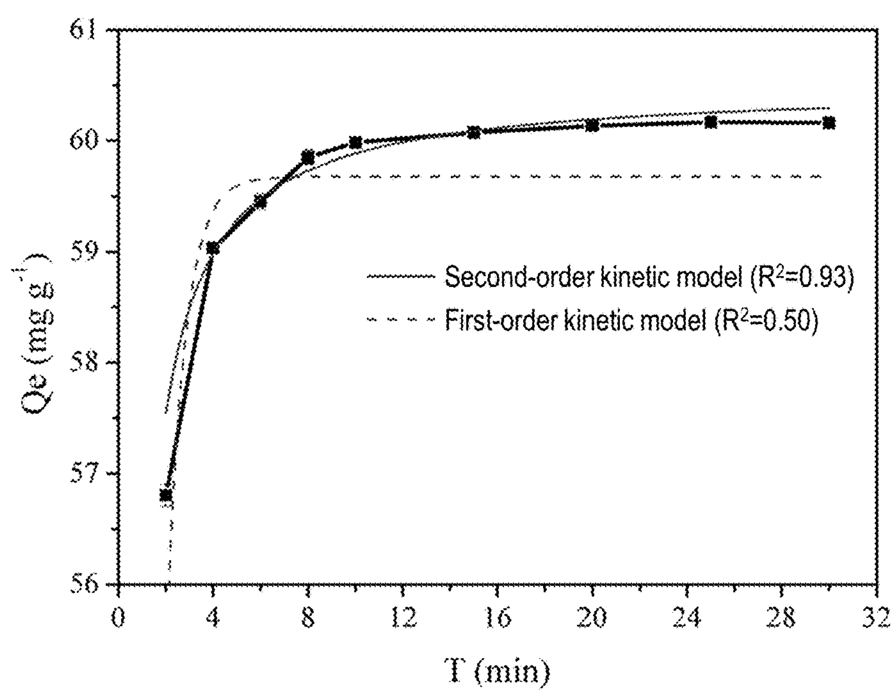
FIG. 4 shows a curve graph of Cd adsorption capacity of the magnetic magnesium-manganese layered double metal oxide composite prepared in example 1 at different times.

(1) multiple parts of 0.005 g magnetic magnesium-manganese layered double metal oxide composites were accurately weighed and respectively placed into 50 ml centrifuge tubes, then 25 mL 12 $mg \cdot L^{-1}$ Cd solution prepared was respectively transferred to the centrifuge tubes for mixing fully, and then placed on a water-bath oscillator at 30±1° C. for oscillation for 2, 4, 6, 8, 10, 15, 20, 25, 30, 60, 90, and 120 min respectively, afterwards, the solution was taken and filtered with a 0.45 μm filter membrane; and an atomic absorption spectrophotometer was used to measure Cd concentration in the solution, and test results were shown in FIG. 4. It can be seen from FIG. 4 that the magnetic magnesium-manganese layered double metal oxide composite can achieve adsorption equilibrium of Cd almost within 10 min, afterwards, the adsorption of Cd has little change with time, which indicates that the magnetic magnesium-manganese layered double metal oxide composite can rapidly remove Cd via immobilization, and has an adsorption capacity up to 59 mg·g$^{-1}$; and the corresponding removal rate is almost 100%.

Figure 5:
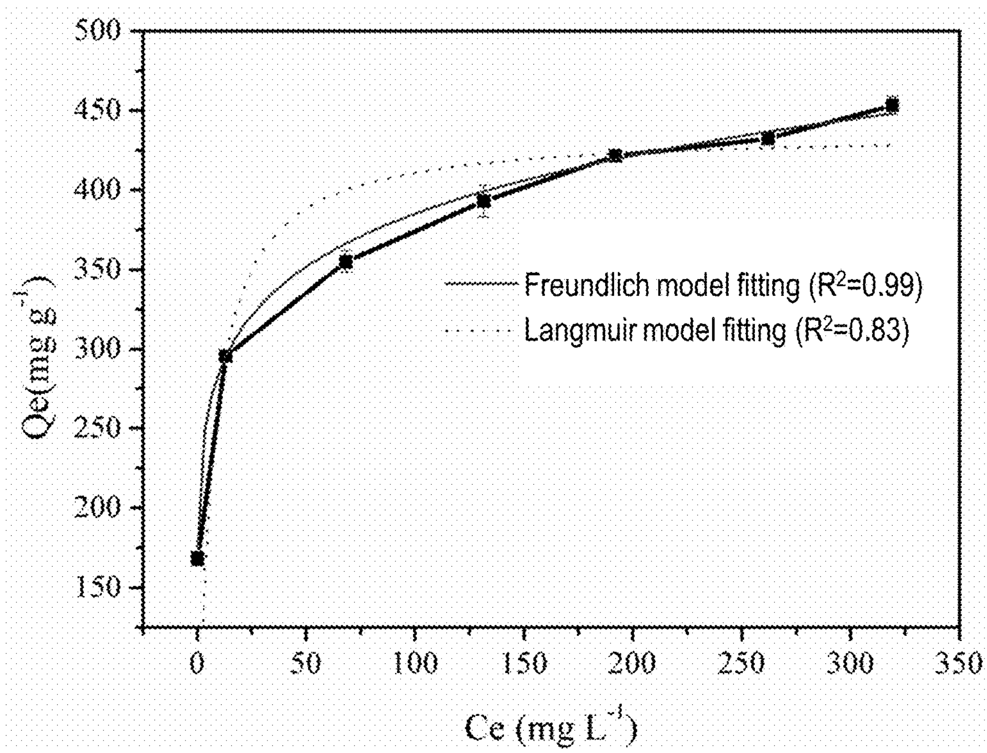
FIG. 5 shows a curve graph of Cd adsorption capacity of the magnetic magnesium-manganese layered double metal oxide composite prepared in example 1 at different Cd initial concentrations.

(2) multiple parts of 0.005 g magnetic magnesium-manganese layered double metal oxide composites were accurately weighed and respectively placed into 50 ml centrifuge tubes, then 25 mL Cd solution at different initial concentrations (the different initial concentration of Cd was set 50 mg·L$^{-1}$, 100 mg·L$^{-1}$, 150 mg·L$^{-1}$, 200 mg·L$^{-1}$, 250 mg·L$^{-1}$, 300 mg·L$^{-1}$, and 350 mg·L$^{-1}$) prepared was respectively transferred to the centrifuge tubes for mixing fully, and then placed on a water-bath oscillator at 30±1° C. for oscillation for 24 h, afterwards, the supernate was taken and filtered with a 0.45 μm filter membrane; and an atomic absorption spectrophotometer was used to measure Cd concentration in the solution. Test results were shown in FIG. 5. It can be seen from FIG. 5 that Freundlich adsorption equation can better describe the adsorption characteristics of the magnetic magnesium-manganese layered double metal oxide composite to Cd, indicating that the adsorption of the magnetic magnesium-manganese layered double metal oxide composite to Cd belongs to multimolecular layer adsorption; Langmuir fitting indicates that the magnetic magnesium-manganese layered double metal oxide composite has a maximum adsorption capacity to Cd up to 436 mg·g$^{-1}$, showing high efficiency of the material.

Figure 6:
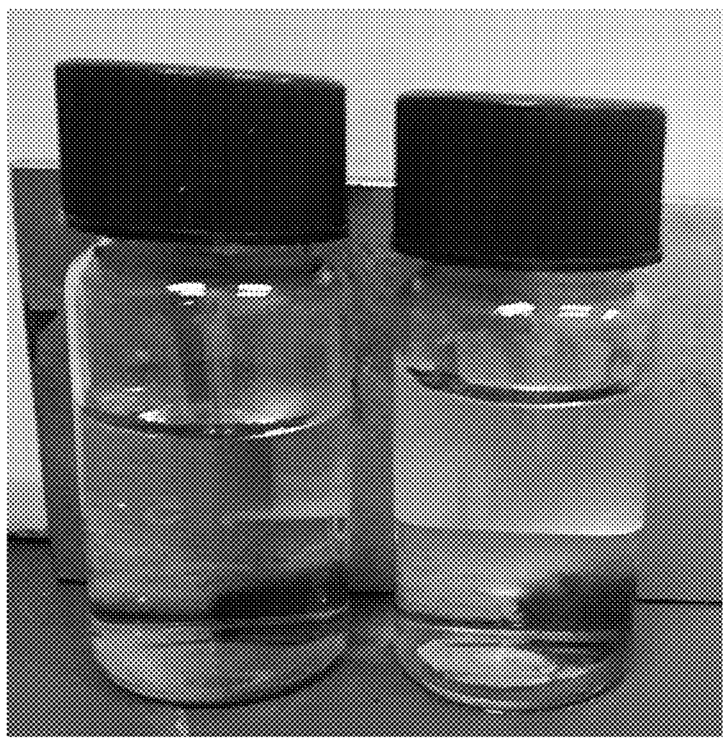
FIG. 6 shows a comparison diagram of the magnetic separation effect between the magnetic magnesium-manganese layered double metal oxide composite after adsorbing Cd (right) in example 1 and ferroferric oxide after adsorbing Cd (left).

(3) multiple parts of 0.005 g magnetic magnesium-manganese layered double metal oxide composites were accurately weighed and respectively placed into 50 ml centrifuge tubes, then 25 mL 12 mg·L$^{-1}$ Cd solution prepared was respectively transferred to the centrifuge tubes for mixing fully, and then placed on a water-bath oscillator at 30±1° C. for oscillation for 30 min, afterwards, the material subjected to adsorption was separated by magnet, and the magnetic separation effect of ferroferric oxide served as a comparison, and the results were shown in FIG. 6. It can be seen from FIG. 6 that left shows the magnetic separation effect of ferroferric oxide, right shows the magnetic separation effect of the magnetic magnesium-manganese layered double metal oxide composite after immobilizing Cd; the figure shows that the magnetic magnesium-manganese layered double metal oxide composite has a considerable magnetic separation effect of the ferroferric oxide, indicating that the material researched and developed by the present invention has relatively strong magnetism, and is easy to achieve magnetic separation.

Example 2

A method for preparing a magnetic magnesium-manganese layered double metal oxide composite, included the following steps.

(1) 0.026 mol magnesium chloride and 0.013 mol manganese chloride were accurately weighed, and dissolved by 500 mL deionized water to obtain a magnesium-manganese salt complex liquid; 0.01 mol sodium carbonate and 0.02 mol sodium hydroxide were dissolved by 250 mL deionized water to obtain a carbonate-hydroxide complex liquid;

(2) 0.25 g nanosized ferroferric oxide powder was added to the carbonate-hydroxide complex liquid, and 250 mL absolute ethanol was added for ultrasonic dispersion for 30 min to obtain a dispersion liquid.

(3) the magnesium-manganese salt complex liquid was slowly dropped into the dispersion liquid in step (2) with a rate of 1 mL/min, aged for 24 h, and then centrifuged at 4000 r/min for 5 min to remove a supernate; the obtained product was washed for several times with deionized water, and dried for 24 h at 60° C., ground for 200-mesh sieving.

(4) the powder obtained in step (3) was placed in a muffle furnace and calcinated for 5 h at 250° C. to obtain a magnetic magnesium-manganese layered double metal oxide composite.

The morphology and structure characterization results of the prepared magnetic magnesium-manganese layered double metal oxide composite show that ferroferric oxide is evenly distributed on a sheet layer of a magnesium-manganese double metal oxide, and a magnetic magnesium-manganese layered double metal oxide composite was formed.

Example 3

A method for preparing a magnetic magnesium-manganese layered double metal oxide composite for the treatment of cadmium pollution problem in environment, included the following steps.

(1) 0.026 mol magnesium chloride and 0.013 mol manganese chloride were accurately weighed, and dissolved by 500 mL deionized water to obtain a magnesium-manganese salt complex liquid; 0.01 mol sodium carbonate and 0.02 mol sodium hydroxide were dissolved by 250 mL deionized water to obtain a carbonate-hydroxide complex liquid.

(2) 0.25 g nanosized ferroferric oxide powder was added to the carbonate-hydroxide complex liquid, and 250 mL absolute ethanol was added for ultrasonic dispersion for 30 min to obtain a dispersion liquid.

(3) the magnesium-manganese salt complex liquid was slowly dropped into the dispersion liquid in step (2) with a rate of 1 mL/min, aged for 24 h, and then centrifuged at 4000 r/min for 5 min to remove a supernate; the obtained product was washed for several times with deionized water, and dried for 24 h at 60° C., ground for 200-mesh sieving.

(4) the powder obtained in step (3) was placed in a muffle furnace and calcinated for 1 h at 550° C. to obtain a magnetic magnesium-manganese layered double metal oxide composite.

The morphology and structure characterization results of the prepared magnetic magnesium-manganese layered double metal oxide composite show that ferroferric oxide is evenly distributed on a sheet layer of a magnesium-manganese double metal oxide, and a magnetic magnesium-manganese layered double metal oxide composite was formed.

The above examples are preferred embodiments of the present invention, but embodiments of the present invention are not limited to the above examples, and any other changes, modification, substitution, combination, and simplification within the spirit and principle of the present invention should be regarded as an equivalent displacement of the present invention, and are included within the protection scope of the present invention.

What is claimed is:

1. A method for preparing a magnetic magnesium-manganese layered double metal oxide composite, comprising the following steps of:

step 1, dissolving a soluble magnesium salt and a manganese salt in water to obtain a magnesium-manganese salt complex liquid; and dissolving a soluble carbonate and a soluble hydroxide in water to obtain a carbonate-hydroxide complex liquid, wherein the manganese salt is a divalent manganese salt;

step 2, adding a ferroferric oxide powder to the carbonate-hydroxide complex liquid to obtain a first solution, and adding ethanol to the first solution to obtain a second solution, and dispersing the ferroferric oxide powder in the second solution by using ultrasonic dispersion to obtain a dispersion liquid, wherein the ferroferric oxide powder is a nanosized powder;

step 3, adding the magnesium-manganese salt complex liquid to the dispersion liquid in step 2 to obtain a third solution, and aging and centrifuging the third solution to obtain a mixture, and washing, drying, grinding and sieving the mixture to obtain a precursor powder; and step 4, calcinating the precursor powder obtained in step 3 at 250-550° C. to obtain the magnetic magnesium-manganese layered double metal oxide composite.

2. The method for preparing the magnetic magnesium-manganese layered double metal oxide composite according to claim 1, wherein in the step 1, the magnesium salt is magnesium chloride, magnesium nitrate or magnesium sulfate; the manganese salt is manganese chloride, manganese nitrate or manganese sulfate; the carbonate is sodium carbonate or potassium carbonate; and the hydroxide is sodium hydroxide or potassium hydroxide.

3. The method for preparing the magnetic magnesium-manganese layered double metal oxide composite according to claim 1, wherein in the step 1, a molar ratio of the magnesium salt to the manganese salt to the carbonate to the hydroxide is (5-60):(5-40):(2-30):(5-60).

4. The method for preparing the magnetic magnesium-manganese layered double metal oxide composite according to claim 1, wherein in the magnesium-manganese salt complex liquid of the step 1, the magnesium salt has a concentration of 0.03-0.09 mol/L; the manganese salt has a concentration of 0.01-0.045 mol/L; and in the carbonate-hydroxide complex liquid, the carbonate has a concentration of 0.005-0.2 mol/L; and hydroxide has a concentration of 0.005-0.4 mol/L.

5. The method for preparing the magnetic magnesium-manganese layered double metal oxide composite according to claim 1, wherein a ratio of the mass of the ferroferric oxide to the mole of the carbonate in the step 2 is (0.5-5) g:(0.01-1) mol.

6. The method for preparing the magnetic magnesium-manganese layered double metal oxide composite according to claim 1, wherein an adding amount of the ethanol in the step 2 is 0.1-2 times a volume of the carbonate-hydroxide complex liquid; and the ultrasonic dispersion time is 10-60 min.

7. The method for preparing the magnetic magnesium-manganese layered double metal oxide composite according to claim 1, wherein the magnesium-manganese salt complex liquid in the step 3 is added to the dispersion liquid in a way of dropwise adding with a rate of 0.1-5 mL/min; the aging time is 12-36 h; the drying refers to drying for 12-36 h at 50-80° C.; and the grinding for sieving refers to grinding for 100 to 500-mesh sieving.

8. The method for preparing the magnetic magnesium-manganese layered double metal oxide composite according to claim 1, wherein the calcinating time in the step 4 is 1-5 h.

9. A magnetic magnesium-manganese layered double metal oxide composite, prepared by the method according to claim 1.

10. A magnetic magnesium-manganese layered double metal oxide composite, prepared by the method according to claim 2.

11. A magnetic magnesium-manganese layered double metal oxide composite, prepared by the method according to claim 3.

12. A magnetic magnesium-manganese layered double metal oxide composite, prepared by the method according to claim 4.

13. A magnetic magnesium-manganese layered double metal oxide composite, prepared by the method according to claim 5.

14. A magnetic magnesium-manganese layered double metal oxide composite, prepared by the method according to claim 6.

15. A magnetic magnesium-manganese layered double metal oxide composite, prepared by the method according to claim 7.

16. A magnetic magnesium-manganese layered double metal oxide composite, prepared by the method according to claim 8.

* * * * *